US011027618B2

(12) United States Patent
Kamikihara (10) Patent No.: US 11,027,618 B2
(45) Date of Patent: Jun. 8, 2021

(54) VEHICLE (71) Applicant: Toyota Jidosha Kabushiki Kaisha, Toyota (JP)

(72) Inventor: Daisuke Kamikihara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 28 days.

(21) Appl. No.: 16/682,424

(22) Filed: Nov. 13, 2019

(65) Prior Publication Data
US 2020/0156485 A1 May 21, 2020

(30) Foreign Application Priority Data

Nov. 21, 2018 (JP) ............................. JP2018-218238

(51) Int. Cl.
B60K 1/04 (2019.01)
B60L 50/64 (2019.01)
B62D 21/15 (2006.01)
B60L 5/00 (2006.01)

(52) U.S. Cl.
CPC ................ B60L 50/64 (2019.02); B60K 1/04 (2013.01); B60L 5/005 (2013.01); B62D 21/152 (2013.01); B60K 2001/0405 (2013.01)

(58) Field of Classification Search
CPC ......... B60L 50/64; B60L 5/0005; B60K 1/04; B62D 21/152; B62D 21/156
See application file for complete search history.

(56) References Cited

U.S. PATENT DOCUMENTS

| 5,862,877 | A | * | 1/1999 | Horton | B60G 7/02 180/312 |
| 6,076,625 | A | * | 6/2000 | Matt | B62D 21/11 180/299 |
| 6,273,208 | B1 | * | 8/2001 | Sand | B60K 5/12 180/299 |
| 7,815,250 | B2 | * | 10/2010 | Oshio | B62D 35/02 296/204 |
| 9,758,030 | B2 | * | 9/2017 | Newman | H05K 999/99 |
| 10,377,432 | B2 | * | 8/2019 | Ayukawa | B62D 35/02 |
| 2009/0261620 | A1 | * | 10/2009 | Dandekar | B62D 21/155 296/187.09 |
| 2013/0026797 | A1 | * | 1/2013 | Onodera | B62D 35/02 296/204 |
| 2018/0148109 | A1 | * | 5/2018 | Ayukawa | B62D 21/11 |

FOREIGN PATENT DOCUMENTS

JP 2018-086906 A 6/2018

* cited by examiner

Primary Examiner — John D Walters
Assistant Examiner — James J Triggs
(74) Attorney, Agent, or Firm — Dinsmore & Shohl LLP (57) ABSTRACT The vehicle is provided with a connecting member configured to connect an onboard device, a suspension member and a body frame. The connecting member includes a first fixture fixed to the suspension member, a second fixture located closer to the power storage device than the first fixture and fixed to the body frame, and a third fixture located between the first fixture and the second fixture and fixed to the onboard device. A section of the connecting member located between the first fixture and the second fixture is configured to bend downward when an external force is applied to the connecting member.

2 Claims, 7 Drawing Sheets

VEHICLE

CROSS REFERENCE TO RELATED APPLICATIONS

This nonprovisional application claims priority to Japanese Patent Application No. 2018-218238 filed on Nov. 21, 2018 with the Japan Patent Office, the entire contents of which are hereby incorporated by reference.

BACKGROUND

Field

The present disclosure relates to a vehicle.

Description of the Background Art

Conventionally, various systems have been proposed for transmitting power in a wireless manner from a power transmission device installed on the ground, for example, to a power reception device mounted on a vehicle.

For example, a power reception device described in Japanese Patent Laying-Open No. 2018-086906 is mounted on a suspension member.

The suspension member includes two side rails spaced in the vehicular width direction, a front cross member disposed on a front end of each side rail, and a rear cross member disposed on a rear end of each side rail and.

The power reception device is disposed in a space formed by the two side rails, the front cross member and the rear cross member.

SUMMARY

For the purpose of increasing the EV travelable distance of a vehicle, the battery has been made larger and larger in size in recent years. In order to ensure the cabin space, for example, the large battery is generally mounted on the lower surface of a floor panel.

The power received by the power reception device is supplied to the battery. The battery and the power reception device are connected by a wire harness or the like, and in order to shorten the length of the wire harness, the battery and the power reception device are disposed adjacent to each other in the longitudinal direction of the vehicle.

For example, the battery may be disposed at a central position of the vehicle, and the power reception device may be disposed at a position in front of the battery. In this case, a front suspension member is provided at a front position on the bottom surface of the vehicle, and the power reception device may be fixed to the front suspension member. Assume that when the power reception device is fixed to the front suspension member and the battery is disposed at a central position of the vehicle, the vehicle encounters a front collision. Under such circumstances, the power reception device may be moved backward by an impact force from the front collision and bump into the battery to damage the battery.

On the other hand, when the battery is disposed at a central position of the vehicle and the power reception device is disposed at a position behind the battery, the same problem will occur when the vehicle encounters a rear collision.

The present disclosure has been made in view of the aforementioned problems, and an object thereof is to provide a vehicle which is provided with a power reception device and a power storage device on the bottom surface thereof and configured to prevent the power reception device from bumping into the power storage device to damage the power storage device at the time of a front collision or a rear collision.

The vehicle according to the present disclosure includes a body frame, a suspension member fixed to the body frame, an onboard device fixed to the suspension member, a fixing member configured to fix the onboard device to the suspension member, a power storage device disposed at a position adjacent to the onboard device in the longitudinal direction of the vehicle, and a connecting member disposed closer to the power storage device than the fixing member and configured to connect the onboard device, the suspension member and the body frame. The connecting member includes a first fixture fixed to the suspension member, a second fixture located closer to the power storage device than the first fixture and fixed to the body frame, and a third fixture located between the first fixture and the second fixture and fixed to the onboard device. A section of the connecting member located between the first fixture and the second fixture is configured to bend downward when an external force is applied to the connecting member.

According to the vehicle mentioned above, when the vehicle encounters a collision in the longitudinal direction, a section of the connecting member located between the first fixture and the second fixture bends downward. Since the onboard device is fixed to the bent section, the onboard device is displaced so as to move downward. Thus, even if the onboard device is moved in the longitudinal direction by an impact force from the collision, the onboard device may be prevented from bumping into the power storage device.

The second fixture includes a first fixture part and a second fixture part located closer to the power storage device than the first fixture part, and in the connecting member, the rigidity of a section located between the first fixture part and the second fixture part is higher than the rigidity of a section located between the first fixture part and the first fixture.

According to the vehicle mentioned above, the rigidity of the section located between the first fixture and the second fixture is higher, so that the section may be prevented from being crushed by the impact force from the collision. Thereby, when an impact force is applied at the time of a collision, the section may be favorably deformed so as to bend downward.

The foregoing and other objects, features, aspects and advantages of the present disclosure will become more apparent from the following detailed description of the present disclosure when taken in conjunction with the accompanying drawings.

DETAILED DESCRIPTION

A vehicle according to an embodiment of the present disclosure will be described with reference to FIGS. 1 to 11. In the configurations illustrated in FIGS. 1 to 11, the same or substantially the same components are denoted by the same reference numerals, and the description thereof will not be repeated. In the following description, when a component described in the embodiment corresponds to a feature defined in the claims, the feature defined in the claims may be parenthesized after the component.

Figure 1:
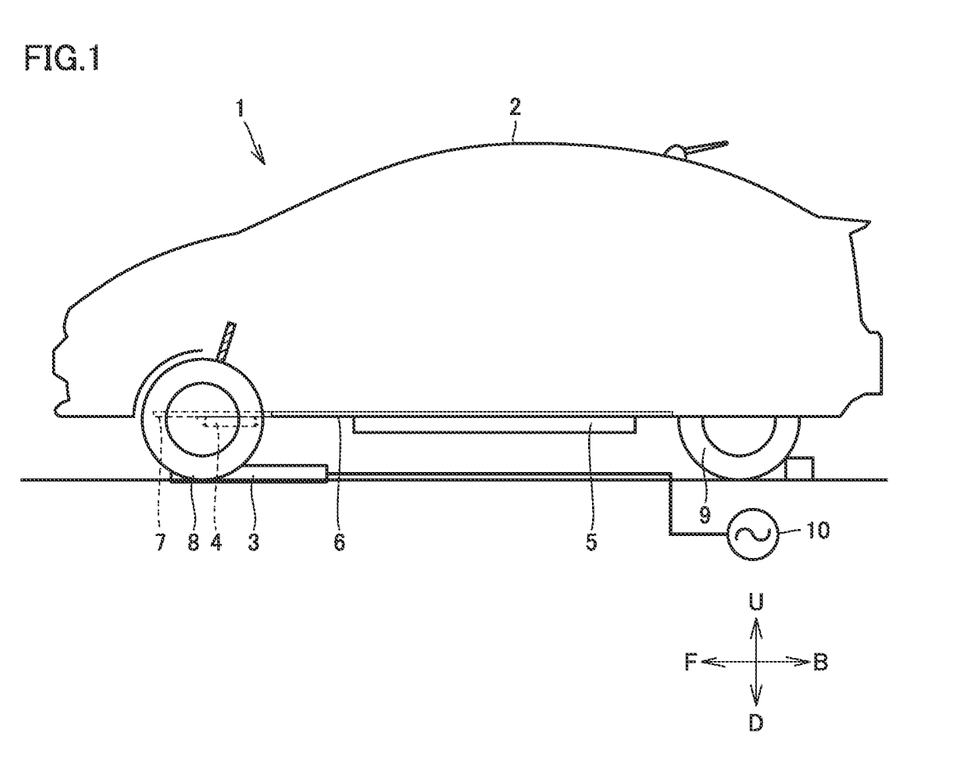
FIG. 1 is a plan view schematically illustrating a wireless charging system 1.

FIG. 1 is a plan view schematically illustrating a wireless charging system 1. The wireless charging system 1 includes a vehicle 2 and a power transmission device 3. The vehicle 2 includes a power reception device 4, a power storage device 5, a floor panel 6, a suspension member 7, a pair of front wheels 8, and a pair of rear wheels 9.

The floor panel 6 and the suspension member 7 are disposed on a bottom surface of the vehicle 2. The floor panel 6 is disposed at a central position of the vehicle 2, and the suspension member 7 is disposed at a position in front of the floor panel 6. For example, the suspension member 7 is disposed between the pair of front Wheels 8.

The power storage device 5 is mounted on a lower surface of the floor panel 6, and the power reception device 4 is mounted on a lower surface of the suspension member 7.

The power transmission device 3 is installed, for example, on the ground, and the power transmission device 3 is connected to an external power supply 10.

Although not illustrated in the figure, the power transmission device 3 is equipped with a power transmission coil, and when an alternating current flows through the power transmission coil, an electromagnetic field is formed around the power transmission coil. The power reception device 4 is also equipped with a power reception coil which is not illustrated in figure, and the power reception coil receives power through the electromagnetic field formed around the power transmission coil.

Figure 2:
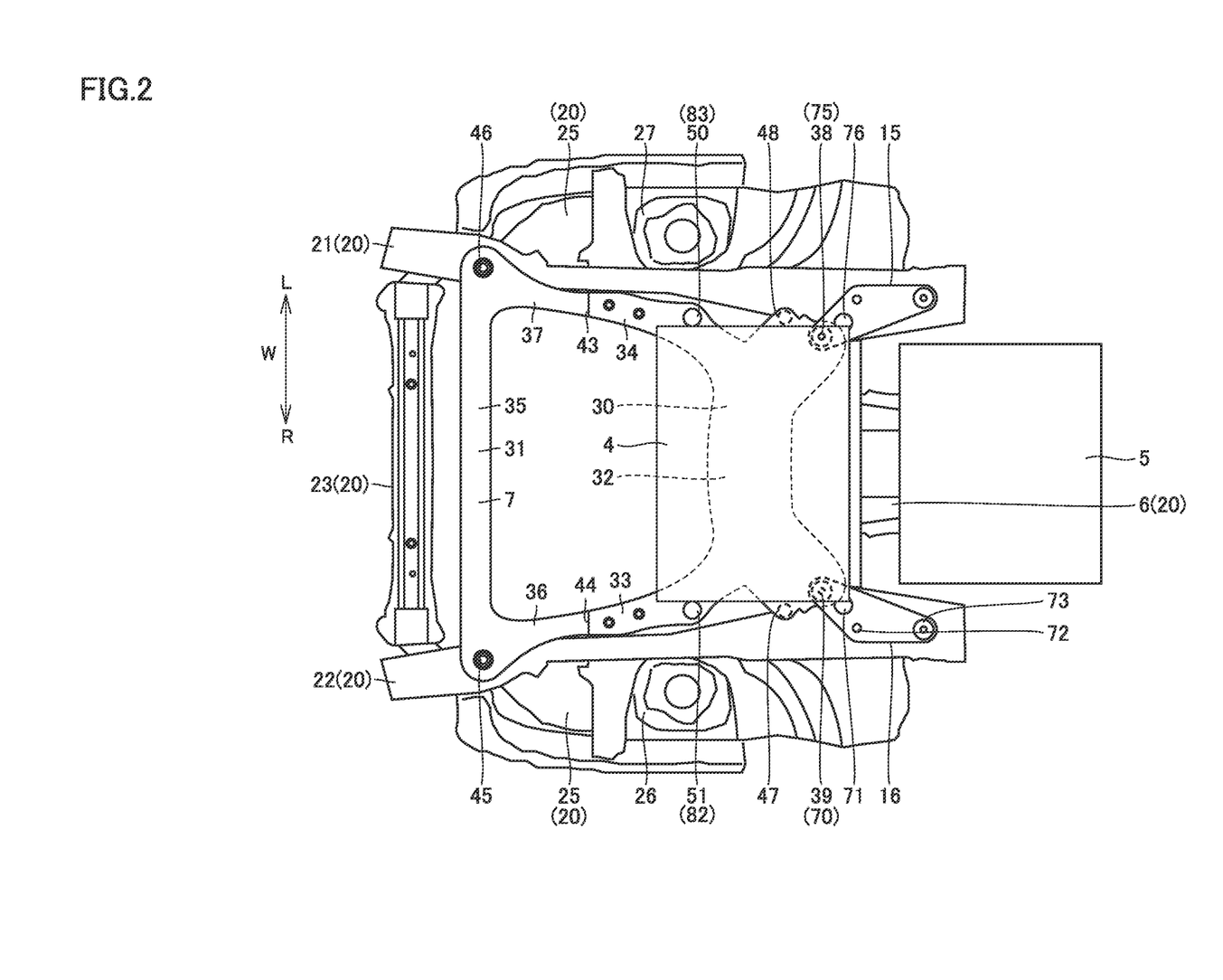
FIG. 2 is a bottom view illustrating a partial bottom surface of a vehicle 2.

FIG. 2 is a bottom view illustrating a partial bottom surface of the vehicle 2. As seen from the figure, the vehicle 2 includes connecting members 15 and 16, a body frame 20, and an exterior member 25.

The body frame 20 includes a floor panel 6, a side member 21, a side member 22, and a front cross member 23. The exterior member 25 includes, for example, a tire housing 26 and a tire housing 27.

The side member 21 and the side member 22 are formed to extend in the longitudinal direction of the vehicle 2. The side member 21 is disposed on the left side of the vehicle 2, and the side member 22 is disposed on the right side of the vehicle 2. The front cross member 23 is disposed on the front end of the vehicle 2, and is configured to connect the side members 21 and 22. The suspension member 7 is disposed at a front portion of the vehicle 2 in front of the floor panel 6.

Figure 3:
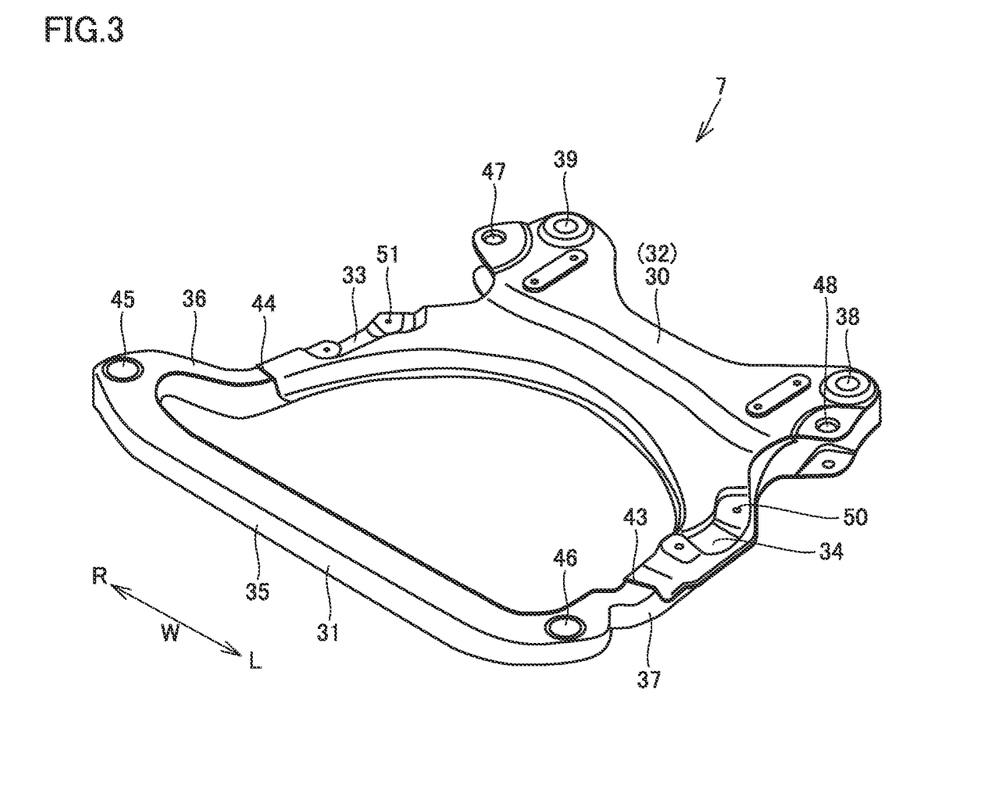
FIG. 3 is a perspective view illustrating a suspension member 7.

The connecting members 15 and 16 are configured to connect the suspension member 7, the body frame 20 and the power reception device 4. FIG. 3 is a perspective view illustrating the suspension member 7.

The suspension member 7 includes a rear sub-frame 30 and a front sub-frame 31. The rear sub-frame 30 includes a rear cross member 32, a sub side rail 33 and a sub side rail 34.

The rear cross member 32 is configured to extend in the vehicular width direction of the vehicle 2. The rear cross member 32 is formed from a light metal material such as aluminum alloy by die casting to have an open shape that opens downward the vehicle body in cross section. The sub side rail 33 is connected to the right end of the rear cross member 32, and is configured to extend toward the front side of the vehicle 2. The sub side rail 34 is connected to the left end of the rear cross member 32, and is configured to extend toward the front side of the vehicle 2. The sub side rails 33 and 34 are formed to open downward.

In the vehicular width direction W, one end of the rear cross member 32 is provided with a connecting hole 38, and the other end of the rear cross member 32 is provided with a connecting hole 39. Thus, the rear cross member 32 is connected to the connecting member 15 illustrated in FIG. 2 by a bolt (not shown) inserted into the connecting hole 38 and connected to the connecting member 16 by a bolt (not shown) inserted into the connecting hole 39.

As illustrated in FIG. 3, the front sub-frame 31 includes a front cross member 35, a side rail 36 and a side rail 37. The front sub-frame 31 is configured to extend in the vehicular width direction W of the vehicle 2. The side rail 36 is connected to the right end of the front cross member 35, and is configured to extend toward the rear side of the vehicle 2. The side rail 37 is connected to the left end of the front cross member 35, and is configured to extend toward the rear side of the vehicle 2.

The front cross member 35 and the side rails 36 and 37 are integrally formed. The front cross member 35 and the side rails 36, 37 are formed from a light metal material (malleable material) such as aluminum alloy by hydroforming to have a closed shape in cross section with a substantially constant circumferential length. Thus, the front sub-frame 31 is more ductile than the rear sub-frame 30.

The thickness of the sub side rails 33 and 34 is larger than the thickness of the side rails 36 and 37. Thus, when the vehicle 2 encounters a front collision or the like and an impact force is applied from the front side of the suspension member 7, the front sub-frame 31 is easier to deform than the rear sub-frame 30.

Figure 4:
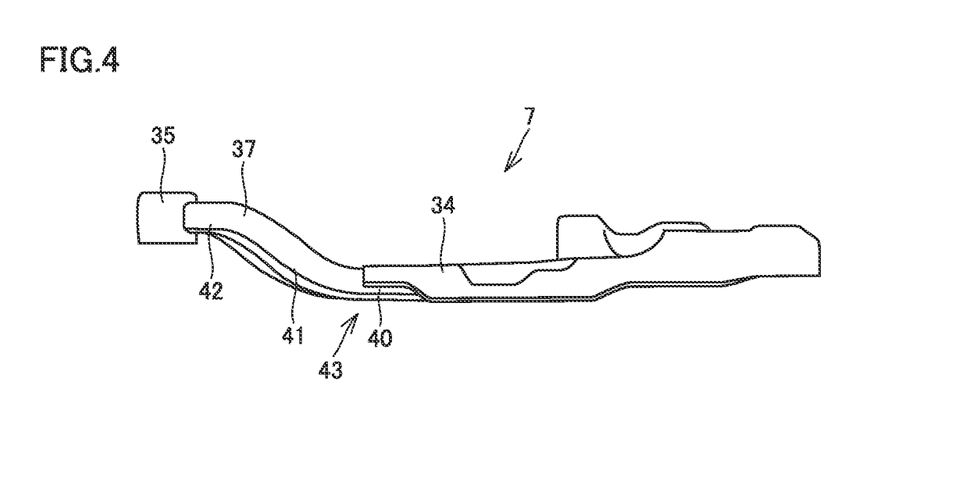
FIG. 4 is a side view illustrating the suspension member 7.

FIG. 4 is a side view illustrating the suspension member 7. The side rail 37 includes an end portion 40, a curved portion 41, and an end portion 42.

The end portion 40 is located on the rear side of the vehicle and is connected to the sub side rail 34. The end portion 42 is located on the front side of the vehicle and is connected to the front cross member 35. The curved portion 41 is configured to curve upward in the direction from the end portion 40 toward the end portion 42. The side rail 36 is formed in the same manner as the side rail 37.

Therefore, when an impact force is applied to the suspension member 7 from the front side of the vehicle, the suspension member 7 is easy to deform by bending downward at a connecting portion 43 between the side rail 34 and the sub side rail 37.

Returning to FIG. 3, a connecting portion 44 is also formed between the side rail 33 and the sub side rail 36. Thus, when an impact force is applied to the suspension member 7 from the front side of the vehicle, the suspension member 7 is easy to deform by bending downward at the connecting portion 44.

Figure 5:
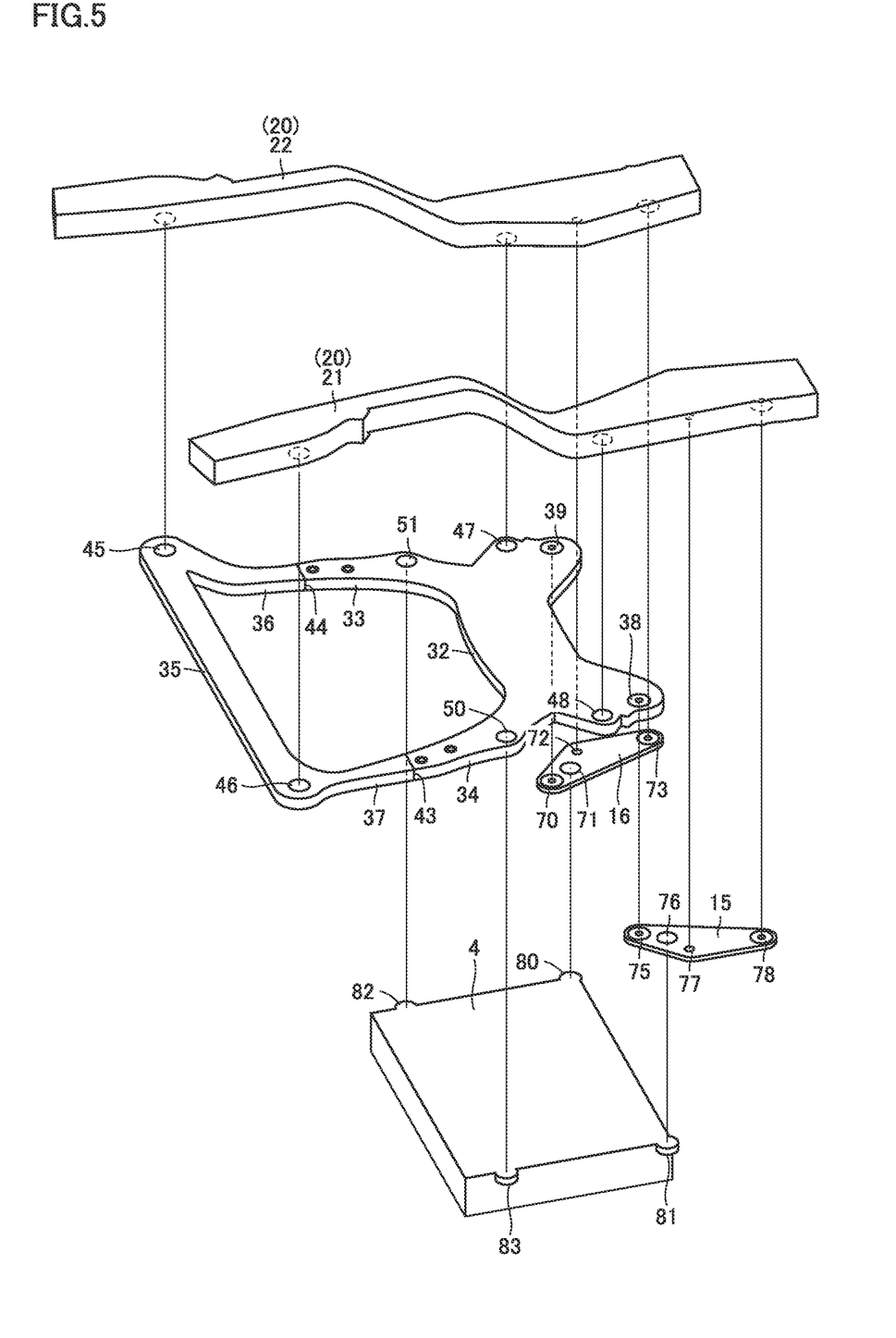
FIG. 5 is an exploded perspective view illustrating side members 21 and 22, a suspension member 7, a power reception device 4, and connecting members 15 and 16.

FIG. 5 is an exploded perspective view illustrating the side members 21 and 22, the suspension member 7, the power reception device 4 and the connecting members 15 and 16.

In the vehicular width direction W, one end of the front cross member 35 is provided with a fixing hole 45, and the other end of the front cross member 35 is provided with a fixing hole 46.

The front cross member 35 is fixed to the side member 22 and 21 by bolts (not shown) inserted into the fixing holes 45 and 46.

The right edge of the rear cross member 32 is provided with a fixing hole 47 and a connecting hole 39, and the left edge of the rear cross member 32 is provided with a fixing hole 48 and a connecting hole 38. The fixing hole 47 and the fixing hole 48 are formed in front of the connecting hole 39 and the connecting hole 38, respectively. Thus, the rear cross member 32 is fixed to the side members 22 and 21 by bolts (not shown) inserted into the fixing holes 47 and 48.

Thereby, the suspension member 7 is firmly fixed to the side members 22 and 21 by the bolts inserted into the fixing holes 47 and 48.

The peripheral edge of each of the fixing holes 47 and 48 and the portion located around each hole in the rear cross member 32 are fixed near a kick-up portion of each of the side members 22 and 21.

The suspension member 7 includes a fixing hole 51 which is provided at a position between the connecting portion 44 and the fixing hole 47 and a fixing hole 50 which is provided at a position between the connecting portion 43 and the fixing hole 48. The fixing holes 51 and 50 are configured to receive a flange 82 and a flange 83 formed on the power reception device 4, respectively.

A flange 80, a flange 81, a flange 82, and a flange 83 are formed on the upper surface of the power reception device 4. The flanges 82 and 83 are formed in front of the flanges 80 and 81 in the longitudinal direction of the vehicle 2.

The connecting member 15 is connected to the suspension member 7 by a bolt (not shown) inserted into the connecting hole 38, and the connecting member 16 is connected to the suspension member 7 by a bolt (not shown) inserted into the connecting hole 36.

The connecting member 16 includes a fixture 70, a fixture 71, a fixture 72, and a fixture 73.

The fixture 70 is fixed to the connecting hole 39 of the suspension member 7. The fixture 72 and the fixture 73 are both fixed to the side member 22. The fixture 71 is fixed to the flange 80 formed on the power reception device 4.

The connecting member 15 is formed with a fixture 75, a fixture 76, a fixture 77, and a fixture 78. The fixture 75 is fixed to the connecting hole 38 of the suspension member 7, and the fixture 76 is fixed to the flange 81 formed on the power reception device 4.

The fixture 77 and the fixture 78 are both fixed to the side member 21.

In the present disclosure, the connecting member 15 and the connecting member 16 are formed symmetric to a central axis in the vehicular width direction. Therefore, the description will be carried out mainly on the connecting member 15.

Figure 6:
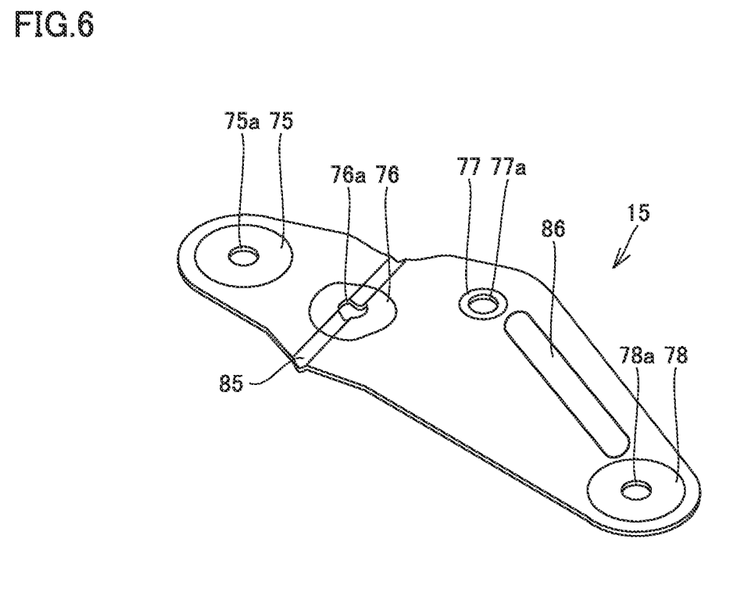
FIG. 6 is a perspective view illustrating the connecting member 15.

FIG. 6 is a perspective view illustrating the connecting member 15. The connecting member 15 is formed in a plate shape, and bolt holes 75a, 76a, 77a and 78a are formed at respective positions where the fixtures 75, 76, 77 and 78 are provided. A bolt (not shown) is inserted into each of the bolt holes 75a, 76a, 77a and 78a. Thereby, the connecting member 15 is fixed to the suspension member 7, the power reception device 4 and the side member 21.

The fixture 75 is provided around the bolt hole 75a and is brought into close contact with the suspension member 7 by a bolt.

Similarly, the fixture 76 is provided around the bolt hole 76a and is brought into close contact with the flange 81 by a bolt, and the fixtures 77 and 78 are provided around the bolt holes 77a and 78a, respectively, and is brought into close contact with the side member 21.

The fixture 75, the fixture 76, the fixture 77 and the fixture 78 are arranged in this order from the front side to the rear side of the vehicle 2.

A bent portion 85 is formed in a section of the connecting member 15 located between the fixture 75 and the fixture 77. The fixture 76 is harmed at a position where the bent portion 85 is located.

The bent portion 85 is configured to bend downward and extend in the vehicular width direction W.

On the upper surface of the connecting member 15, a section located between the fixture 77 and the fixture 78 is formed with a bead 86. Thus, the thickness of a portion where the bead 86 is formed is thicker than the thickness of the other portions other than the bead 86.

Therefore, the rigidity of the section located between the fixture 77 and the fixture 78 is higher than the rigidity of the section located between the fixture 75 and the fixture 77.

Figure 7:
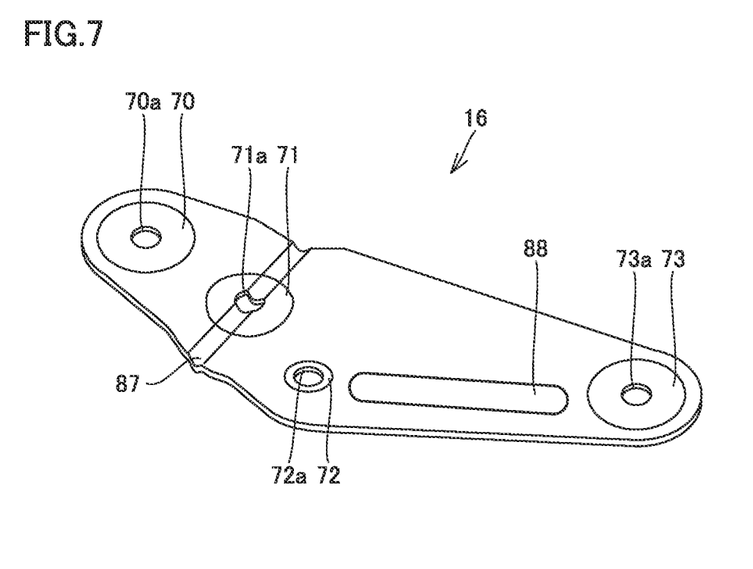
FIG. 7 is a perspective view illustrating the connecting member 16.

FIG. 7 is a perspective view illustrating the connecting member 16. The connecting member 16 is provided with bolt holes 70a, 71a, 72a and 73a, and the bolt holes 70a, 71a, 72a and 73a are arranged in this order from the front side to the rear side of the vehicle 2.

The fixture 70 is provided around the bolt hole 70a, and the fixtures 71, 72 and 73 are provided around the bolt holes 71a, 72a and 73a, respectively. Similarly, a bent portion 87 is formed in a section of the connecting member 16 located between the fixture 70 and the fixture 72. The bent portion 85 is also configured to bend downward and extend in the vehicular width direction W.

On the upper surface of the connecting member 16, a section located between the fixture 72 and the fixture 73 is formed with a bead 88. Thus, the thickness of a portion where the bead 88 is formed is thicker than the thickness of the other portions. Therefore, the rigidity of the section located between the fixture 72 and the fixture 73 is higher than the rigidity of the section located between the fixture 70 and the fixture 72.

Figure 8:
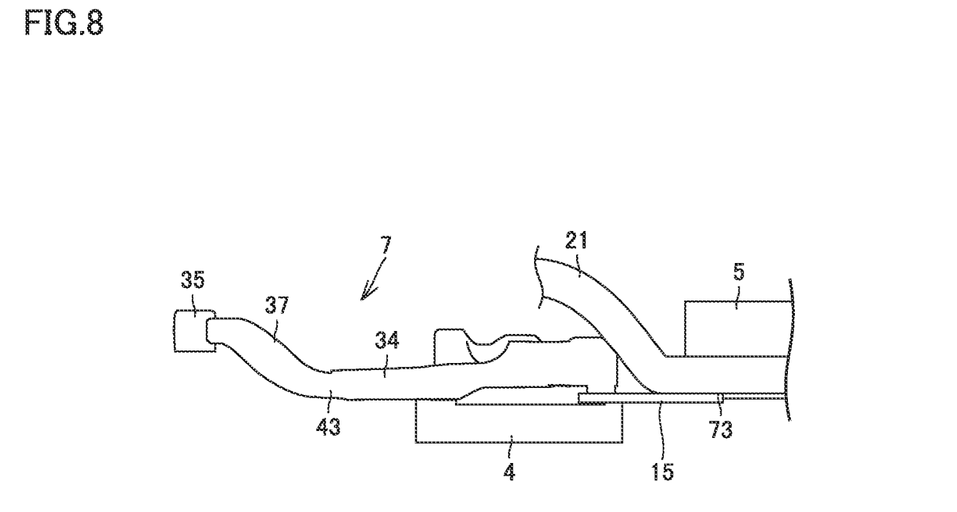
FIG. 8 is a side view illustrating a state of the suspension member 7, the power reception device 4 and the connecting member 15 before the vehicle 2 encounters a front collision.

FIG. 8 is a side view illustrating a state of the suspension member 7, the power reception device 4 and the connecting member 15 before the vehicle 2 encounters a front collision.

Figure 9:
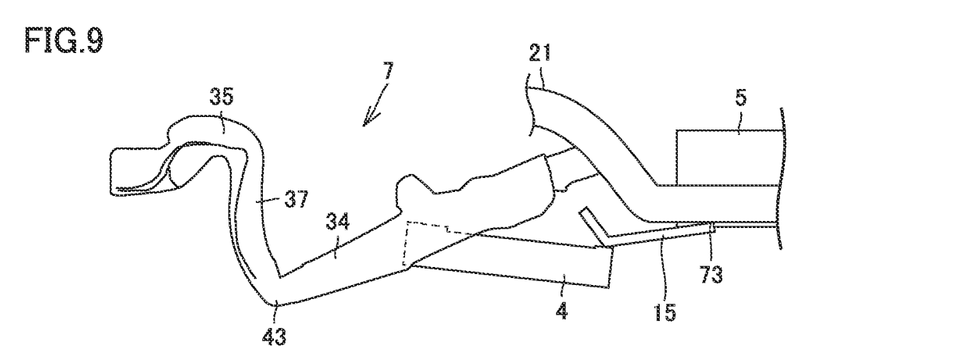
FIG. 9 is a side view illustrating a state of the suspension member 7, the power reception device 4 and the connecting member 15 after the vehicle 2 encounters a front collision.
Figure 10:
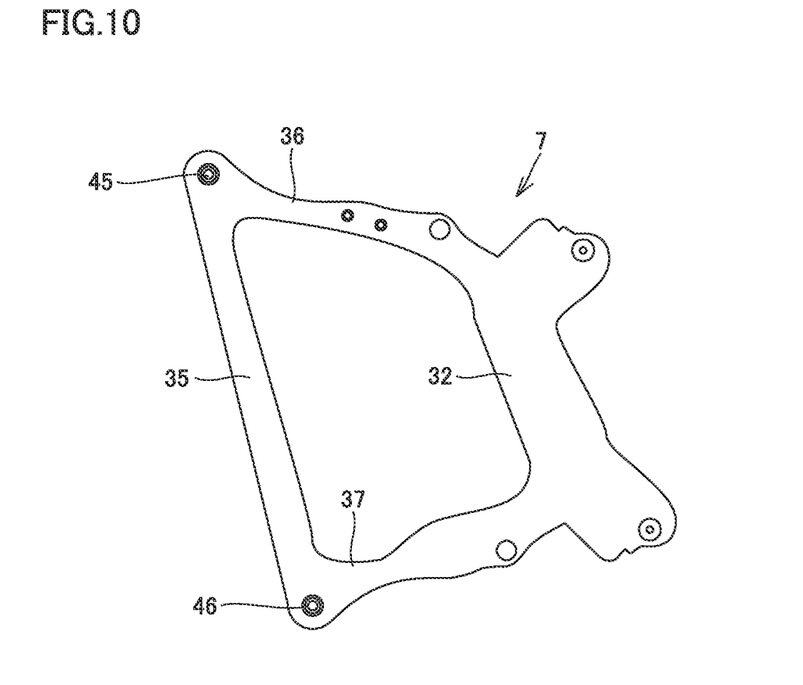
FIG. 10 is a plan view illustrating the suspension member 7 after the vehicle 2 encounters a front collision.

FIG. 9 is a side view illustrating a state of the suspension member 7, the power reception device 4 and the connecting member 15 after the vehicle 2 encounters a front collision, and FIG. 10 is a plan view illustrating the suspension member 7 after the vehicle 2 encounters a front collision.

As illustrated in FIG. 9, since the power storage device 5 is disposed away from the front end of the vehicle 2, the mounting position of the power storage device 5 does not change greatly after the collision.

Although the front end of the side member 21 is deformed, the portion of the side member 21 to which the fixture 73 of the connecting member 15 is fixed is separated from the front end of the side member 21. Therefore, the position of this portion does not change greatly after the collision.

In the present disclosure, before the front collision, the side rail 37 of the suspension member 7 is configured to curve upward in the direction toward the front side of the vehicle 2. Furthermore, since the rigidity of the sub-side rail 34 is high, the side rail 37 is bent downward at the connecting portion 43 at the time of a front collision.

The suspension member 7 is moved toward the rear side of the vehicle 2 by an impact force from the front collision.

Along with the movement of the suspension member 7, the power reception device 4 fixed to the suspension member 7 is also moved rearward.

At this time, since the connecting member 15 is connected to the suspension member 7, the impact force is transmitted to the connecting member 15. Thereby, the connecting member 15 is made to deform.

Figure 11:
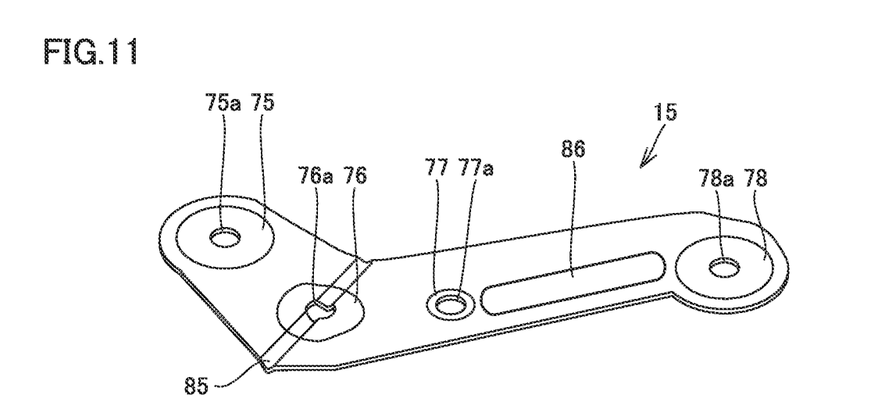
FIG. 11 is a perspective view illustrating the connecting member 15 in a bent state.

FIG. 11 is a perspective view illustrating the connecting member 15 in a bent state. As seen from FIGS. 9 and 11, when an impact force is applied to the connecting member 15, the connecting member 15 is bent downward at the bent portion 85.

The bent portion 85 is formed to bend downward in advance, and the rigidity of the section located between the fixture 77 and the fixture 78 is higher due to the bead 86.

As a result, the connecting member 15 is bent at the bent portion 85 by the impact force applied to the connecting member 15.

The section of the connecting member 15 located between the fixture 77 and the fixture 78 has a higher rigidity. Therefore, even if an impact force is applied to the connecting member 15, the connecting member 15 is prevented from undergoing such a deformation as to shorten the length between the fixture 77 and the fixture 78.

Further, since the connecting member 15 is firmly fixed at the fixture 78, the fixture 78 and the side member 21 are maintained in the fixed state even if an impact force is applied to the connecting member 15.

As a result, the portion of the connecting member 15 located between the fixture 78 and the bent portion 87 inclines downward in the direction from the fixture 78 toward the bent portion 85.

Since the fixture 76 is provided at the bent portion 85, the flange 81 fixed to the fixture 76 is pushed downward by the deformed connecting member 15.

Since the flange 81 is formed on the rear end of the power reception device 4, the rear end of the power reception device 4 is pushed downward.

Since the rear end of the power reception device 4 is moved downward, and as illustrated in FIG. 9, the power reception device 4 is displaced so as to enter below the power storage device 5. Thereby, the power reception device 4 is prevented from bumping into the power storage device 5.

Although it has been described that the connecting member 15 is pushed downward by the flange 81 of the power reception device 4 at the time of a front collision so that the rear end of the power reception device 4 is displaced downward, and as illustrated in FIG. 5, the rear end of the power reception device 4 is also displaced downward by the connecting member 16.

Specifically, when the vehicle 2 encounters a front collision, as illustrated in FIG. 6, the connecting member 16 is also bent downward at the bent portion 87.

Also in the connecting member 16, a bead 88 is formed on a section located between the fixture 71 and the fixture 73 and slightly spaced from the bent portion 87. Thus, the section located between the fixture 72 and the fixture 73 may be prevented from being crushed by an impact force at the time of a front collision. As a result, at the time of a front collision, the section located between the fixture 72 and the fixture 73 rotates around the fixture 73 so that the portion located closer to the fixture 72 is displaced downward. Accordingly, the flange 80 of the power reception device 4 fixed to the fixture 71 is also forced to move downward.

As described above, since the rear end of the power reception device 4 is provided with the flanges 80 and 81, and at the time of a front collision, the connecting member 15 connected to the flange 81 and the connecting member 16 connected to the flange 80 force the flanges 80 and 81 to move downward. Thereby, the rear end of the power reception device 4 is displaced downward at the time of the front collision, and even if the power reception device 4 is moved backward, the power reception device 4 is prevented from bumping into the power storage device 5 disposed behind the power reception device 4.

Although in the above embodiment, it is described that the power reception device 4 is disposed in front of the power storage device 5, the present disclosure may be applied to the case where the power reception device 4 is disposed behind the power storage device 5.

For example, the power reception device 4 may be fixed to the rear suspension member. Then, the end of the power reception device 4 closer to the power storage device 5, the rear side frame and the rear suspension member may be connected by a connecting member. The connecting member is formed in the same manner as the connecting members 15 and 16.

Although in the above embodiment, it is described that the connecting members 15 and 16 are used to fix the power reception device 4, but the fixing target is not limited to the power reception device 4. The connecting members may be used to fix the other onboard devices such as a fuel tank.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A vehicle comprising:
   a body frame;
   a suspension member fixed to the body frame;
   an onboard device fixed to the suspension member;
   a fixing member configured to fix the onboard device to the suspension member;
   a power storage device disposed at a position adjacent to the onboard device in a longitudinal direction of the vehicle; and
   a connecting member disposed closer to the power storage device than the fixing member and configured to connect the onboard device, the suspension member and the body frame,
   the connecting member including:
   a first fixture fixed to the suspension member;
   a second fixture located closer to the power storage device than the first fixture and fixed to the body frame; and
   a third fixture located between the first fixture and the second fixture and fixed to the onboard device, a section of the connecting member located between the first fixture and the second fixture being configured to bend downward when an external force is applied to the connecting member.

2. The vehicle according to claim 1, wherein
the second fixture includes a first fixture part and a second fixture part located closer to the power storage device than the first fixture part, and
in the connecting member, the rigidity of a section located between the first fixture part and the second fixture part is higher than the rigidity of a section located between the first fixture part and the first fixture.

* * * * *